United States Patent
Hecht

(10) Patent No.: US 8,573,909 B2
(45) Date of Patent: Nov. 5, 2013

(54) TOOL COUPLING

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 531 days.

(21) Appl. No.: 13/025,952

(22) Filed: Feb. 11, 2011

(65) Prior Publication Data

US 2011/0200408 A1    Aug. 18, 2011

(30) Foreign Application Priority Data

Feb. 17, 2010    (IL) .......................................... 204008

(51) Int. Cl.
B23B 27/16    (2006.01)
(52) U.S. Cl.
USPC ........... 409/234; 408/233; 407/103; 403/364; 279/8
(58) Field of Classification Search
USPC ........... 409/234; 408/231, 233; 407/102, 103; 403/361, 364; 279/8
IPC ...................................................... B23B 27/16
See application file for complete search history.

(56) References Cited

U.S. PATENT DOCUMENTS

| | | | |
|---|---|---|---|
| 2,460,673 A * | 2/1949 | Berscheid | 175/419 |
| 7,150,590 B2 | 12/2006 | Schäfer et al. | |
| 7,153,066 B2 * | 12/2006 | Schafer et al. | 407/30 |
| 7,325,471 B2 * | 2/2008 | Massa et al. | 82/1.11 |
| 7,641,423 B2 * | 1/2010 | Blucher et al. | 407/66 |
| 2008/0232909 A1 * | 9/2008 | Filho et al. | 407/7 |

FOREIGN PATENT DOCUMENTS

| | | | | |
|---|---|---|---|---|
| DE | 3402547 A1 * | 8/1985 | | B23B 27/16 |
| DE | 102004023710 A1 * | 12/2005 | | B23D 77/00 |
| DE | 102005062631 A1 * | 1/2007 | | B23C 5/10 |
| DE | 102006055277 A1 * | 5/2008 | | B23B 27/16 |
| EP | 1702703 A1 | 9/2006 | | |
| EP | 1795288 A1 | 6/2007 | | |
| KR | 20-2000-0020103 | 1/2001 | | |

OTHER PUBLICATIONS

International Search Report dated May 31, 2011 issued in corresponding International Application No. PCT/IL2011/000106.

* cited by examiner

*Primary Examiner* — Daniel Howell
*Assistant Examiner* — Michael Vitale
(74) *Attorney, Agent, or Firm* — Womble Carlyle

(57) ABSTRACT

In a tool coupling in the form of a cutting tool used for internal machining operations, a second component having a single cutting portion is clamped to a first component by means of a clamping screw. The second component has a mounted surface with three male engaging members interfacing with three female engagement members on a mounting surface of the first component. Each of the three female engagement members has two sets of side surfaces located on a shared portion, the shared portion exhibiting mirror symmetry about a first plane, and each set of side surfaces having two opposing flank surfaces separated by the first plane. Only one of the two flank surfaces of each of the two sets of side surfaces is in clamping contact with a corresponding abutment surface on each of the three male engaging members.

19 Claims, 5 Drawing Sheets

US 8,573,909 B2

TOOL COUPLING

FIELD OF THE INVENTION

The present invention relates to a tool coupling for use in metal cutting processes in general, and for internal machining operations in particular.

BACKGROUND OF THE INVENTION

Within the field of metal cutting tools, a cutting head may be secured to a tool holder in many different ways, including a cutting head in the form of a cutting insert manufactured from a hard material, namely cemented carbide, secured to the tool holder by means of a clamping screw.

KR 20-2000-0020103 discloses an indexable boring tool having a cutting insert with a single cutting edge detachably fixed to a cylindrical holder by means of a screw. A pair of dome-shaped protrusions and a plurality of first serrations extending perpendicularly to the dome-shaped protrusions on a bottom surface of the cutting insert are located in a V-groove and a plurality of second serrations, respectively, in a top surface of the holder. Inclined surfaces on the plurality of first serrations come into contact with correspondingly inclined surfaces of the second serrations to prevent rotation of the cutting insert during a cutting operation, and part of the dome-shaped protrusions come into contact with an inclined surface of the V-groove to assist in preventing rotation of the cutting insert and to achieve a precise location of the cutting insert with respect to the holder.

U.S. Pat. No. 7,150,590 discloses a milling tool having a cutting plate with four radially projecting cutting edges secured to a frontal end of a milling shaft by means of a fastening screw. Three radially extending ribs projecting from an end surface of the cutting plate are mounted within three complementary shaped grooves in a seat on the frontal end, where each rib and each groove have two side flanks and two side walls, respectively, and where the two side flanks and the two side walls have different angles of inclination to provide for axial positioning and transfer of torque between the cutting plate and the milling shaft.

SUMMARY OF THE INVENTION

In accordance with the present invention, there is provided a tool coupling comprising a first component, a second component and a clamping member for clamping the first and second components together:

the first component having a mounting surface provided with a longitudinal axis and at least three female engagement members; and the second component having a mounted surface with at least three male engaging members interfacing with the at least three female engagement members, wherein each of the at least three female engagement members has a first plane and at least two sets of side surfaces, the at least two sets of side surfaces located on at least a shared portion of their respective female engagement member, and the shared portion exhibiting mirror symmetry about its respective first plane, wherein each of the at least two sets of side surfaces has two opposing flank surfaces separated by their respective first plane, and wherein only one of the two flank surfaces of each of the at least two sets of side surfaces is in clamping contact with a corresponding abutment surface on each of the at least three male engaging members.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
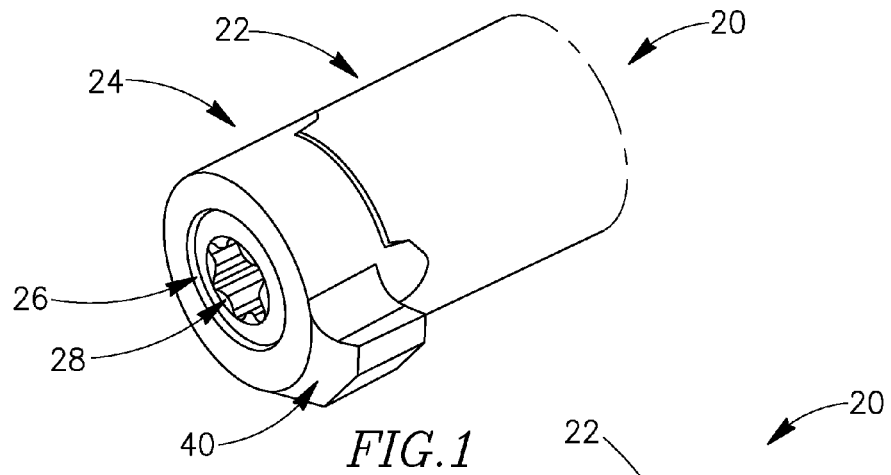
FIG. 1 is a perspective view of a tool coupling in accordance with some embodiments of the present invention.
Figure 2:
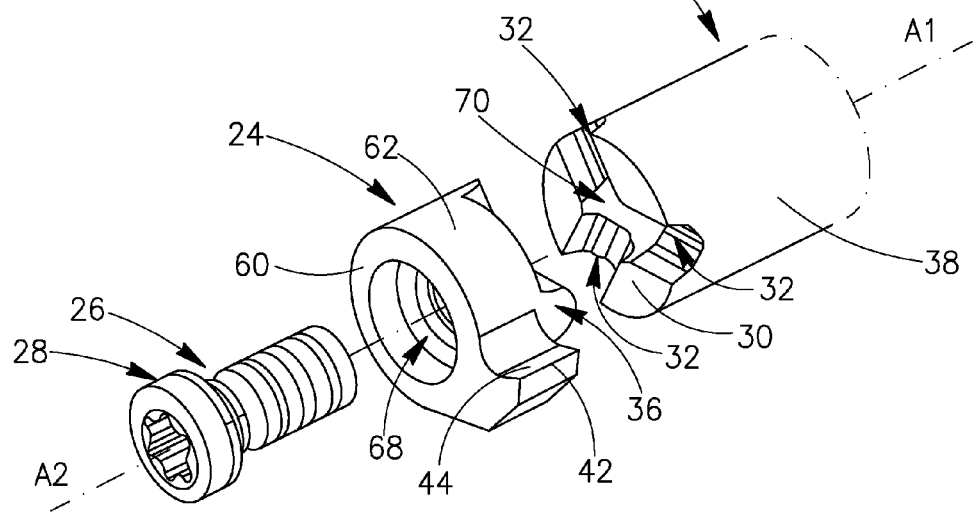
FIG. 2 is a first exploded perspective view of the tool coupling shown in FIG. 1.
Figure 3:
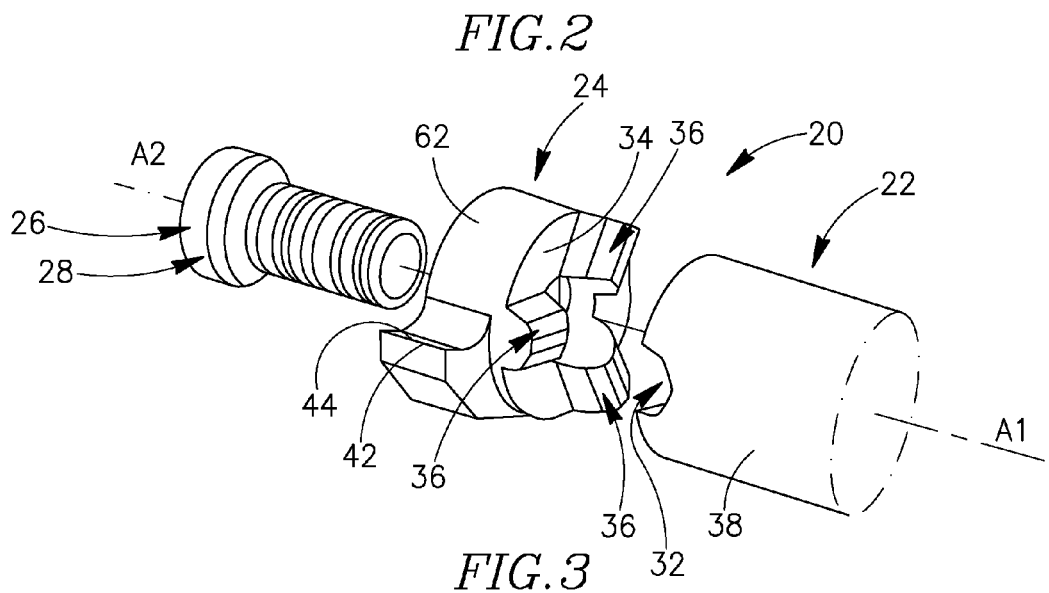
FIG. 3 is a second exploded perspective view of the tool coupling shown in FIG. 1.

Attention is first drawn to FIGS. 1, 2 and 3, showing a tool coupling 20 in accordance with some embodiments of the present invention. The tool coupling 20 is in the form of a cutting tool used for internal machining operations, including a first component 22, a second component 24 and a clamping member 26 for clamping the first 22 and second 24 components together.

In some embodiments of the present invention, the clamping member 26 may be in the form of a clamping screw 28.

In some embodiments of the present invention, as shown in FIGS. 4 to 11, the first component 22 has a mounting surface 30 which may have exactly three female engagement members 32 and the second component 24 has a mounted surface 34 which may have exactly three male engaging members 36 interfacing with the three female engagement members 32. In other embodiments of the present invention (not shown), the first component has a mounting surface which may have more than three female engagement members and the second component has a mounted surface which may have more than three engaging members interfacing with the more than three engagement members. As depicted in FIGS. 4 to 11, the mounting surface 30 is a forward facing mounting surface while the mounted surface 34 is a rearward facing mounted surface.

The first component 22 may have a generally cylindrical shape with a continuous peripheral surface 38 adjacent the mounting surface 30 and a longitudinal axis A1 extending through the mounting surface 30, being manufactured from machined steel. The second component 24 may include a single cutting portion 40 having a cutting edge 42 and an associated rake surface 44, being manufactured by form pressing and sintering a carbide powder such as tungsten carbide.

In other embodiments of the present invention (not shown), the first component may be manufactured from tungsten carbide and include the cutting portion, with the second component being manufactured from machined steel. In further embodiments of the present invention (not shown), the first component or the second component may include more than a single cutting portion.

In some embodiments, as shown in FIGS. 4, 5, 8 and 9, the mounting surface 30 of the first component 22, may be generally planar and exhibit rotational symmetry about the longitudinal axis A1, where each of the three female engagement members 32 are identical and circumferentially equally spaced about the longitudinal axis A1.

Each of the three female engagement members 32 may be generally groove-shaped, having a first plane P1 and exactly two sets of side surfaces 46, 48. In other embodiments of the present invention (not shown), each of the three female engagement members may have more than two sets of side surfaces.

As shown in FIGS. 4, 5, 8 and 9, the two sets of side surfaces 46, 48 are located on a shared portion 58 of their respective female engagement member 32, the shared portion 58 exhibiting mirror symmetry about its respective first plane P1.

In some embodiments of the present invention, the two sets of side surfaces 46, 48 may extend beyond the shared portion 58.

Each of the two sets of side surfaces 46, 48 has two opposing flank surfaces 50, 52; 54, 56 separated by their respective first plane P1.

Figure 5:
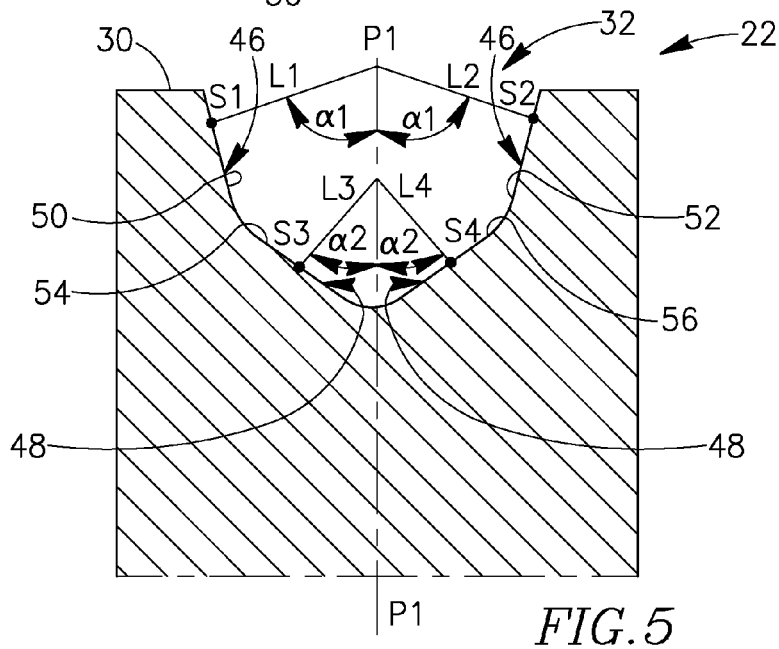
FIG. 5 is a cut view of the first component shown in FIG. 4 taken along the line V-V.
Figure 9:
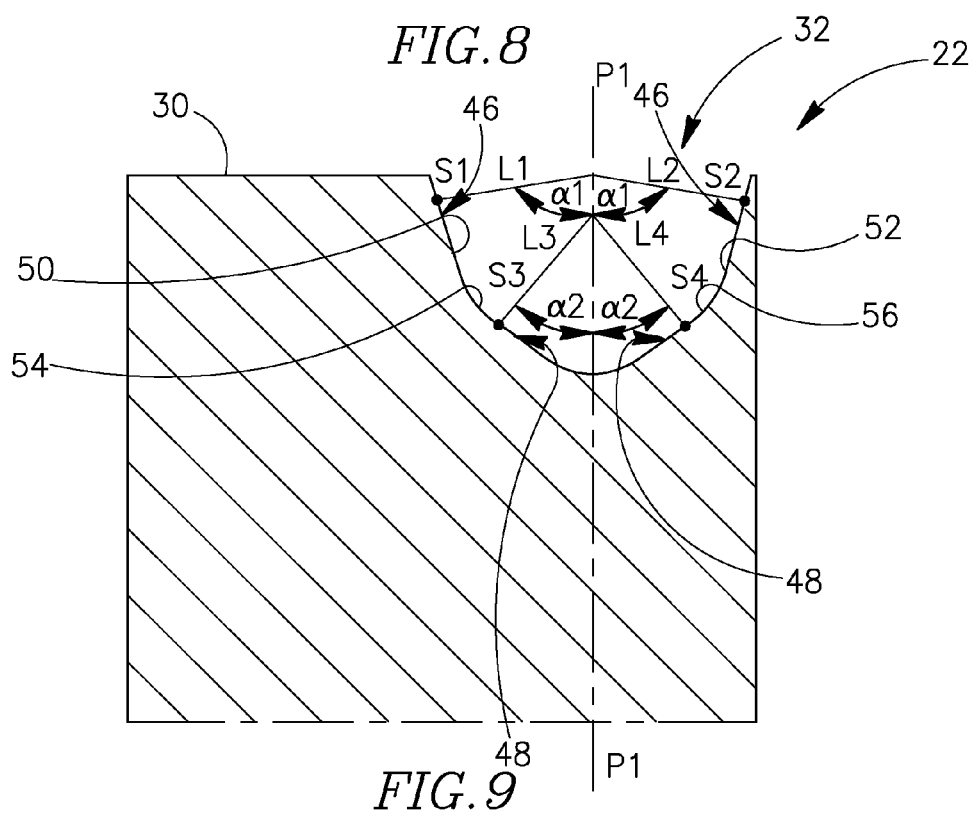
FIG. 9 is a cut view of the first component shown in FIG. 8 taken along the line IX-IX.
Figure 10:
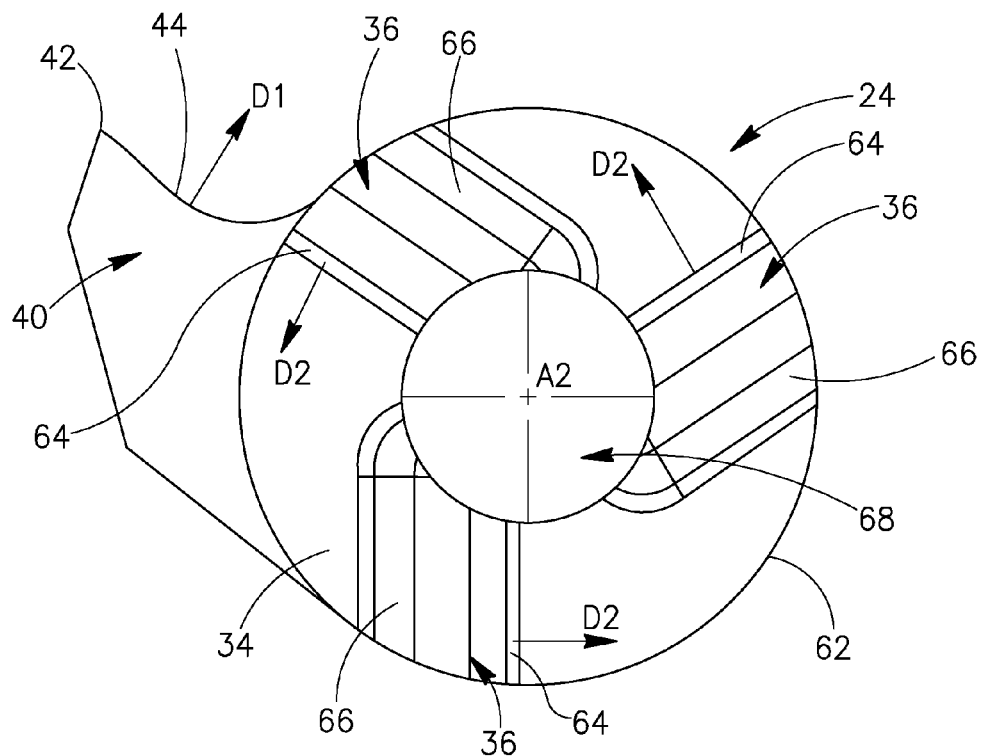
FIG. 10 is a rearward end view of a second component in accordance with the second preferred embodiment of the present invention.
Figure 11:
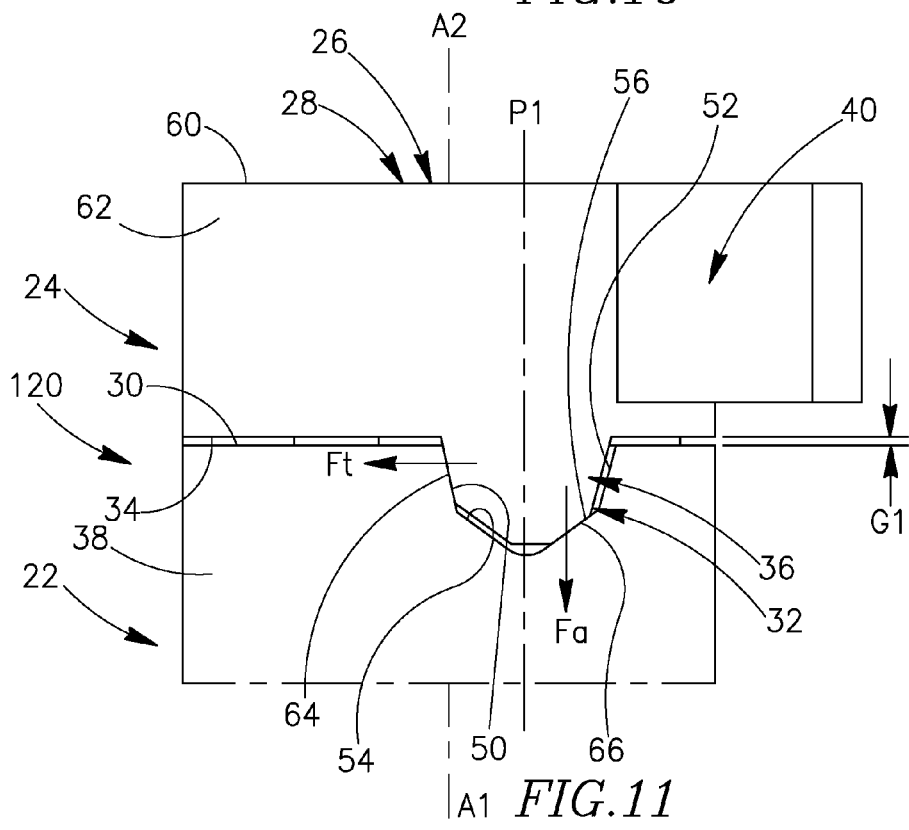
FIG. 11 is a side view of a tool coupling in accordance with the second preferred embodiment of the present invention.

As shown in FIGS. 5 and 9, a first set of side surfaces 46 comprises first 50 and second 52 upper flank surfaces adjacent the mounting surface 30 and a second set of side surfaces 48 comprises first 54 and second 56 lower flank surfaces spaced apart from the mounting surface 30.

The two flank surfaces 50, 52; 54, 56 of the two sets of side surfaces 46, 48 of each of the three female engagement members 32 may intersect the peripheral surface 38, and each shared portion 58 may extend in a direction parallel to the generally planar mounting surface 30.

Figure 4:
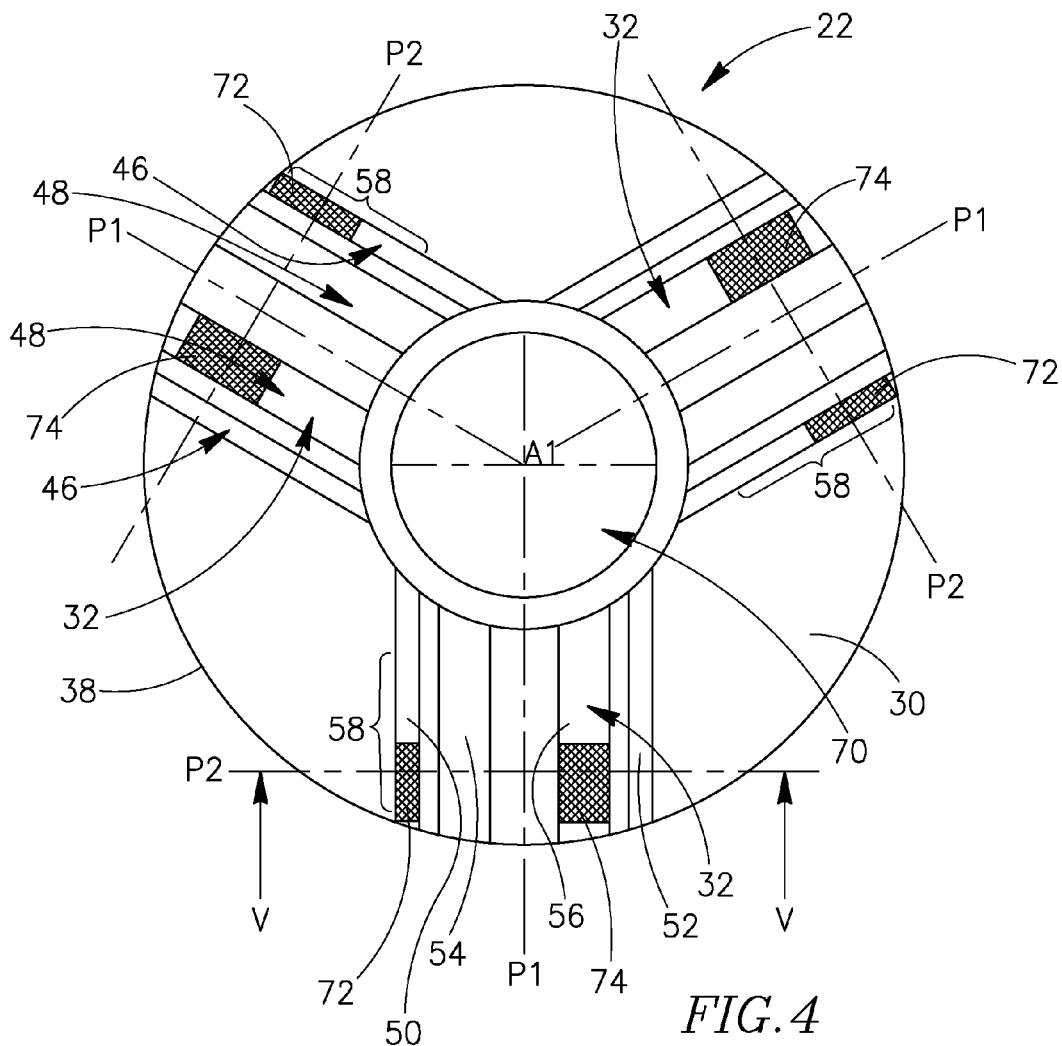
FIG. 4 is a forward end view of a first component in accordance with a first preferred embodiment of the present invention.

In a first preferred embodiment of the tool coupling 20, as shown in FIGS. 4 and 5, the two flank surfaces 50, 52; 54, 56 of the two sets of side surfaces 46, 48 of each female member 32 exhibit mirror symmetry about their respective first plane P1.

In some embodiments of the present invention, each of the flank surfaces 50, 52, 54, 56 may have a shallow convex shape, and in other embodiments (not shown), each of the flank surfaces may be generally planar.

In some embodiments, as shown in FIGS. 5 and 9, the first planes P1 of the three female engagement members 32 may each be perpendicular to the generally planar mounting surface 30 enabling a milling tool (not shown) rotating about its rotary axis perpendicular to the mounting surface 30 to simultaneously form the two flank surfaces 50, 52; 54, 56 of the two sets of side surfaces 46, 48 of each female engagement member 32.

The two flank surfaces 50, 52; 54, 56 of each of the two sets of side surfaces 46, 48 of the three female engagement members 32 may have surface points S1, S2; S3, S4 mirror symmetrical about their respective first plane P1. Reference lines L1, L2 perpendicular to the mirror symmetrical surface points S1, S2 of the first upper 50 and second upper 52 flank surfaces, respectively, on the first set of side surfaces 46, may each form a first engagement angle $\alpha 1$ with their respective first plane P1, and reference lines L3, L4 perpendicular to the mirror symmetrical surface points S3, S4 of the first 54 and second 56 lower flank surfaces, respectively, on the second set of side surfaces 48, may each form a second engagement angle $\alpha 2$ with their respective first plane P1, where the first $\alpha 1$ and second $\alpha 2$ engagement angles are different.

In some embodiments, the first engagement angle $\alpha 1$ may be greater than the second engagement angle $\alpha 2$.

In some embodiments, as shown in FIGS. 1, 2, 3, 6 and 10, the second component 24 may have a cylindrical shape with a diameter similar or equal to the diameter of the first component 22, with an end surface 60 opposing the generally planar mounted surface 34 and a continuous external surface 62 extending therebetween.

In some embodiments, each of the three male engaging members 36 on the mounted surface 34, as shown FIGS. 6, 7, 10 and 11, may be generally rib-shaped having two abutment surfaces 64, 66, a first abutment surface 64 corresponding with the first upper flank surface 50 on each of the three female engagement members 32 and a second abutment surface 66 corresponding with the second lower flank surface 56 on each of the three female engagement members 32. The first upper flank surface 50 and the second lower flank surface 56 of each of the three female engagement members 32 are separated by their respective first planes P1.

In some embodiments of the present invention, the first 64 and second 66 abutment surfaces may be generally planar, corresponding with the shallow convex shaped first upper 50 and second lower 56 flank surfaces, respectively, and in other embodiments (not shown), the first and second abutment surfaces may be shallow convex shaped, corresponding with generally planar first upper and second lower flank surfaces, respectively.

For assembly of the first 22 and second 24 components, the mounted surface 34 is oriented opposite the mounting surface 30 before the three male engaging members 36 are located within the three female engagement members 32.

In some embodiments where each of the three female engagement members 32 are identical and circumferentially equally spaced about the longitudinal axis A1, the three male engaging members 36 may be located within the three female engagement members 32 in three different circumferential positions. For this type of embodiment and where the second component 24 has a single cutting portion 40, the first component 22 may include a locating feature (not shown) with which the single cutting portion 40 can be suitably aligned.

The clamping screw 28 is passed through a through bore 68 extending between the end surface 60 and the mounted surface 34, before threadingly engaging a threaded bore 70 in the mounting surface 30. The clamping screw 28 is then suitably fastened such that the three first abutment surfaces 64 make clamping contact with the three first upper flank surfaces 50 and the three second abutment surfaces 66 make clamping contact with the three second lower flank surface 56.

In some embodiments, the threaded bore 70 may be coaxial with the longitudinal axis A1 and the threaded bore 70 may also be coaxial with the through bore 68.

Following assembly of the first 22 and second 24 components, an axial gap G1 remains between the generally planar mounted surface 34 and the generally planar mounting surface 30, and there is no contact between the first 22 and second 24 components apart from the three first upper flank surfaces 50 in clamping contact with the three first abutment surfaces 64 and the three second lower flank surface 56 in clamping contact with the three second abutment surfaces 66.

Figure 6:
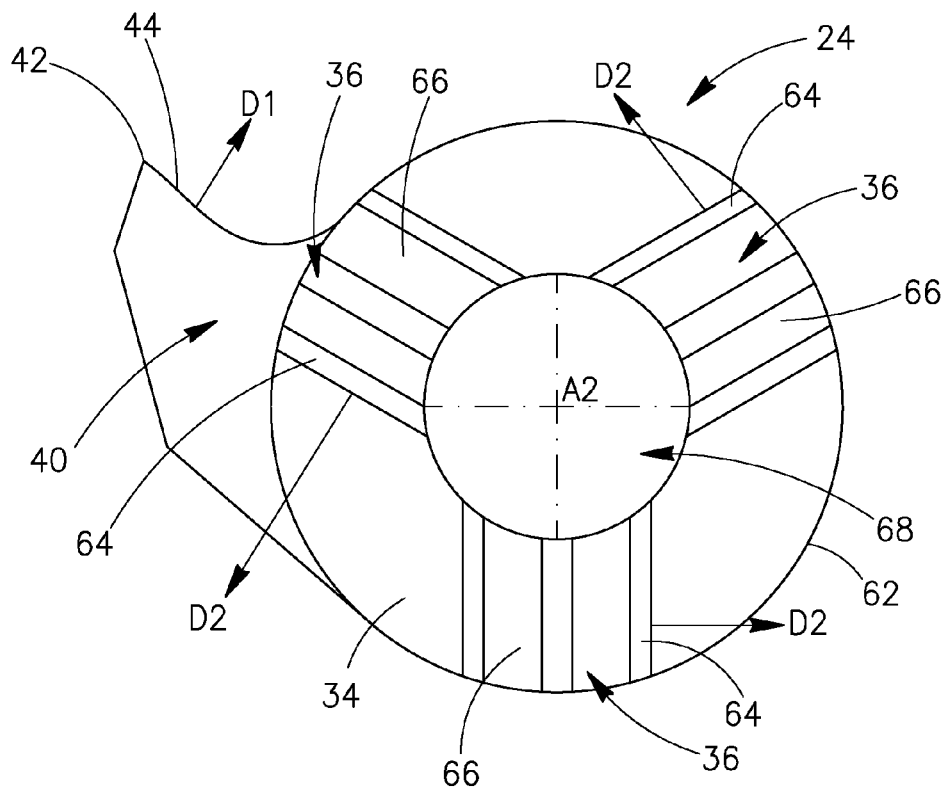
FIG. 6 is a rearward end view of a second component in accordance with the first preferred embodiment of the present invention.
Figure 7:
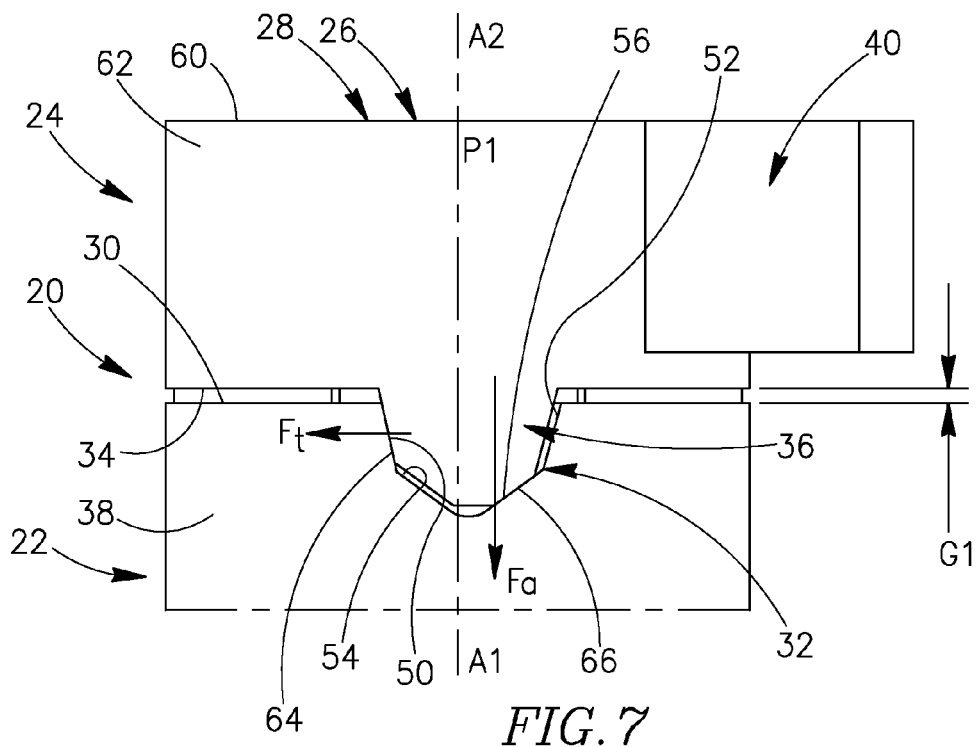
FIG. 7 is a side view of the tool coupling in accordance with the first preferred embodiment of the present invention.

In the first preferred embodiment of the tool coupling 20, as shown in FIGS. 4 to 7, the first planes P1 of the three female engagement members 32 may be radially directed and thus contain the longitudinal axis A1, and the mounting surface 30 may exhibit mirror symmetry about each first plane P1. The first preferred embodiment of the tool coupling 20 offers a greater flexibility of configuration, where the same first component 22 provides equal clamping performance for both the second component 24 with its single right-handed cutting portion 40, as shown in FIGS. 6 and 7, and an equivalent second component with a left-handed cutting portion (not shown).

The abutting arrangement seen in FIG. 7 is replicated at the interface between each engaged pair of male and female members. Generally speaking, only one of the first and second upper flank surfaces 50, 52 of each female engagement member 32 is engaged by a first abutment surface 64 of a corresponding male engaging member 36, and only one of the first and second lower flank surfaces 54, 56 of each female engagement member 32 is engaged by a second abutment surface 66 of a corresponding male engaging member 36. Furthermore, the engaged upper flank surfaces are all on one side of their respective first planes P1 of the corresponding female engagement members 32 and the engaged lower flank surfaces are all on the other side of their respective first planes P1 of the corresponding female engagement members 32.

In some embodiments, the first 64 and second 66 abutment surfaces of each of the three male engaging members 36 intersect the external surface 62 and diverge slightly in a direction away from the external surface 62 such that clamping contact with the first upper 50 and second lower 56 flank surfaces, respectively, on each of the three female engagement members 32, occurs at two contact zones 72, 74 adjacent the peripheral surface 38.

In the first preferred embodiment of the tool coupling 20, as shown in FIG. 4, second planes P2 perpendicular to the first planes P1 intersect the two respective contact zones 72, 74 of each female engagement member 32.

The first upper flank surfaces 50 of the three engagement members 32 may be described as driving surfaces, forming angles of between 5° and 30° with the longitudinal axis A1, primarily to transfer torque between the first 22 and second 24 components and react against a tangential cutting force Ft directed through the first abutment surfaces 64 of the three male engaging members 36 (see FIG. 7). The rake surface 44 associated with the cutting edge 42 generally faces in a first tangential direction D1 relative to a central axis A2 which is coaxial with the through bore 68. Meanwhile, the first abutment surfaces 64 of the three male engaging members 36 generally face in an opposite second tangential direction D2.

The second lower flank surfaces 56 of the three engagement members 32 may be described as supporting surfaces, forming angles of between 35° and 75° with the longitudinal axis A1, primarily to react against an axial clamping force Fa directed through the second abutment surfaces 66 of the three male engaging members 36 generated by the fastening of the clamping screw 28.

Figure 8:
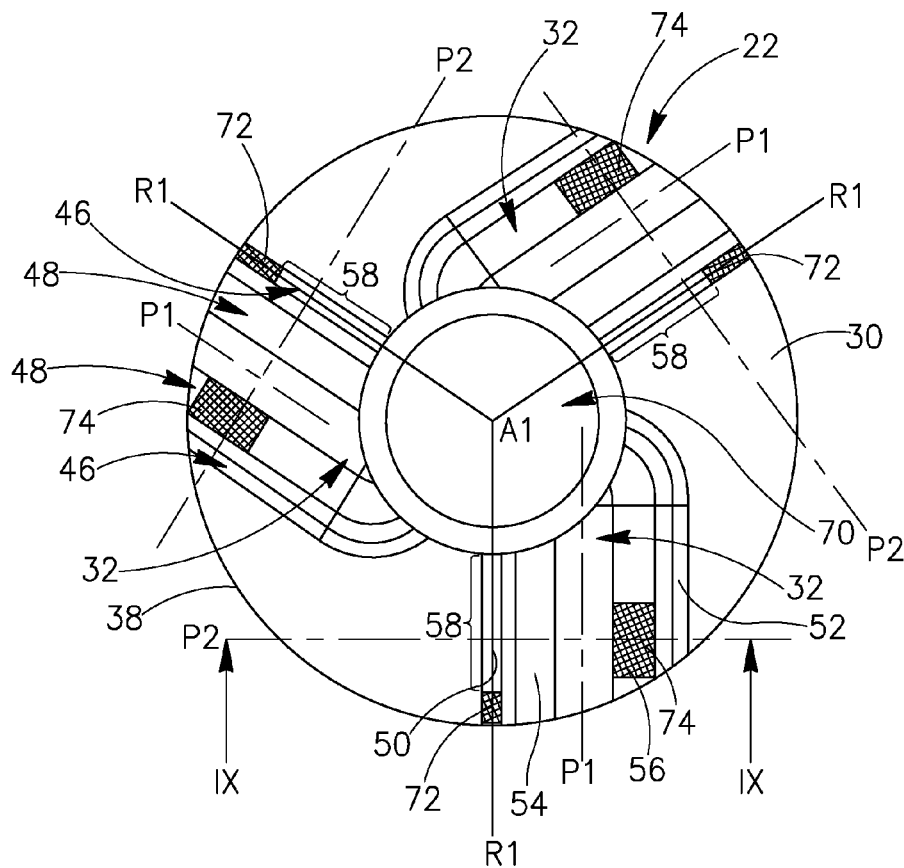
FIG. 8 is a forward end view of a first component in accordance with a second preferred embodiment of the present invention.

In a second preferred embodiment of the tool coupling 120, as shown in FIGS. 8 to 11, torque transfer between the first 22 and second 24 components and reaction of the first upper flank surfaces 50 against the tangential cutting force Ft directed through the first abutment surfaces 64 may be improved by arranging the first upper flank surfaces 50 such that they each extend along a radial line R1 which intersects the longitudinal axis A1. As best seen in FIG. 8, the first planes P1 are offset from, and parallel to, their corresponding radial lines R1, and so are parallel to, but do not contain, the longitudinal axis A1.

Although the present invention has been described to a certain degree of particularity, it should be understood that various alterations and modifications could be made without departing from the spirit or scope of the invention as hereinafter claimed.

What is claimed is:

1. A tool coupling (20, 120) comprising a first component (22), a second component (24) and a clamping member (26) for clamping the first (22) and second (24) components together:
    the first component (22) having a mounting surface (30) provided with a longitudinal axis (A1) and at least three female engagement members (32); and
    the second component (24) having a mounted surface (34) with at least three male engaging members (36) interfacing with the at least three female engagement members (32),
    wherein each of the at least three female engagement members (32) has a first plane (P1) and at least two sets of side surfaces (46, 48), the at least two sets of side surfaces (46, 48) located on at least a shared portion (58) of their respective female engagement member (32), and the shared portion (58) exhibiting mirror symmetry about its respective first plane (P1),
    wherein each of the at least two sets of side surfaces (46, 48) has two opposing flank surfaces (50, 52; 54, 56) separated by their respective first plane (P1), and
    wherein only one of the two flank surfaces (50, 52; 54, 56) of each of the at least two sets of side surfaces (46, 48) is in clamping contact with a corresponding abutment surface (64, 66) on each of the at least three male engaging members (36).

2. The tool coupling (20, 120) according to claim 1, wherein the mounting surface (30) is generally planar, and
    wherein the first planes (P1) are perpendicular to the mounting surface (30).

3. The tool coupling (20, 120) according to claim 2, wherein each shared portion (58) extends in a direction parallel to the generally planar mounting surface (30).

4. The tool coupling (20, 120) according to claim 1, wherein the two flank surfaces (50, 52; 54, 56) of each of the at least two sets of side surfaces (46, 48) have surface points (S1, S2; S3, S4) mirror symmetrical about their respective first plane (P1), and reference lines (L1, L2; L3, L4) perpendicular to the surface points (S1, S2; S3, S4) forming equal acute engagement angles (α1; α2) with their respective first plane (P1), and
    wherein the engagement angles (α1, α2) associated with the at least two sets of side surfaces (46, 48) are different.

5. The tool coupling (20) according to claim 1, wherein the two flank surfaces (50, 52; 54, 56) of each of the at least two sets of side surfaces (46, 48) exhibit mirror symmetry about their respective first plane (P1).

6. The tool coupling (20) according to claim 1, wherein the mounting surface (30) exhibits mirror symmetry about the first plane (P1) of the at least three female engagement members (32).

7. The tool coupling (20, 120) according to claim 1, wherein the mounting surface (30) has exactly three female engagement members (32) and the mounted surface (34) has exactly three male engaging members (36).

8. The tool coupling (20, 120) according to claim 1, wherein the first component (22) has a generally cylindrical shape with a continuous peripheral surface (38) adjacent the mounting surface (30),
and wherein the two flank surfaces (50, 52; 54, 56) of each of the at least two sets of side surfaces (46, 48) intersect the peripheral surface (38).

9. The tool coupling (20, 120) according to claim 1, wherein the mounting surface (30) exhibits rotational symmetry about the longitudinal axis (A1).

10. The tool coupling (120) according to claim 1, wherein the first planes (P1) of the at least three female engagement members (32) are parallel to, but do not contain, the longitudinal axis (A1).

11. The tool coupling (20) according to claim 1, wherein the first planes (P1) of the at least three female engagement members (32) are radially directed and contain the longitudinal axis (A1).

12. The tool coupling (20) according to claim 1, wherein clamping contact between the only one of the two flank surfaces (50, 52; 54, 56) of each of the at least two sets of side surfaces (46, 48) and the corresponding abutment surfaces (64, 66) occurs at contact zones (72, 74) on each of the at least three female engagement members (32), and
wherein second planes (P2) perpendicular to the first planes (P1) intersect the respective contact zones (72, 74) of each female engagement member (32).

13. The tool coupling (20, 120) according to claim 4, wherein each of the at least three female engagement members (32) has exactly two sets of side surfaces (46, 48).

14. The tool coupling (20, 120) according to claim 13, wherein each of the at least three female engagement members (32) has a first set (46) of side surfaces adjacent the mounting surface (30), the reference lines (L1, L2) perpendicular to the surface points (S1, S2) of the two flank surfaces (50, 52) thereof forming a first engagement angle (α1) with their respective first plane (P1), and a second set (48) of side surfaces spaced apart from the mounting surface (30), the reference lines (L3, L4) perpendicular to the surface points (S3, S4) of the two flank surfaces (54, 56) thereof forming a second engagement angle (α2) with their respective first plane (P1), and
wherein the first engagement angle (α1) is greater than the second engagement angle (α2).

15. The tool coupling (20, 120) according to claim 14, wherein the first set (46) of side surfaces has first upper (50) and second upper (52) flank surfaces and the second set (48) of side surfaces has first lower (54) and second lower (56) flank surfaces,
wherein only one of the first upper (50) and second upper (52) flank surfaces is in clamping contact with a first abutment surface (64), and only one of the first lower (54) and second lower (56) flank surfaces is in clamping contact with a second abutment surface (66), and
wherein the said only one of the first upper (50) and second upper (52) flank surfaces and the said only one of the first lower (54) and second lower (56) flank surfaces are separated by their respective first plane (P1).

16. The tool coupling (120) according to claim 15, wherein:
the first upper flank surface (50) is in clamping contact with the first abutment surface (64), and
the first upper flank surface (50) extends along a radial line (R1) which intersects the longitudinal axis (A1).

17. The tool coupling (20, 120) according to claim 15, wherein the second component (24) includes at least one cutting portion (40) and a through bore (68) extending between the mounted surface (34) and an opposing end surface (60), and
wherein the clamping member (26) in the form of a clamping screw (28) passes through the through bore (68) and threadingly engages a threaded bore (70) in the mounting surface (30) of the first component (22).

18. The tool coupling (20, 120) according to claim 17, wherein the through bore (68) and the threaded bore (70) are coaxial.

19. The tool coupling (20, 120) according to claim 17, wherein the at least one cutting portion (40) includes a cutting edge (42) and an associated rake surface (44), and
wherein relative to a central axis (A2) coaxial with the through bore (68), the rake surface (44) of the at least one cutting portion (40) generally faces in a first tangential direction (D1) and the first abutment surfaces (64) of the at least three male engaging members (36) generally face in an opposite second tangential direction (D2).

\* \* \* \* \*